C. C. CLAWSON.
COIN CONTROLLED VENDING MACHINE.
APPLICATION FILED DEC. 30, 1910.
1,048,660.
Patented Dec. 31, 1912.
3 SHEETS—SHEET 1.
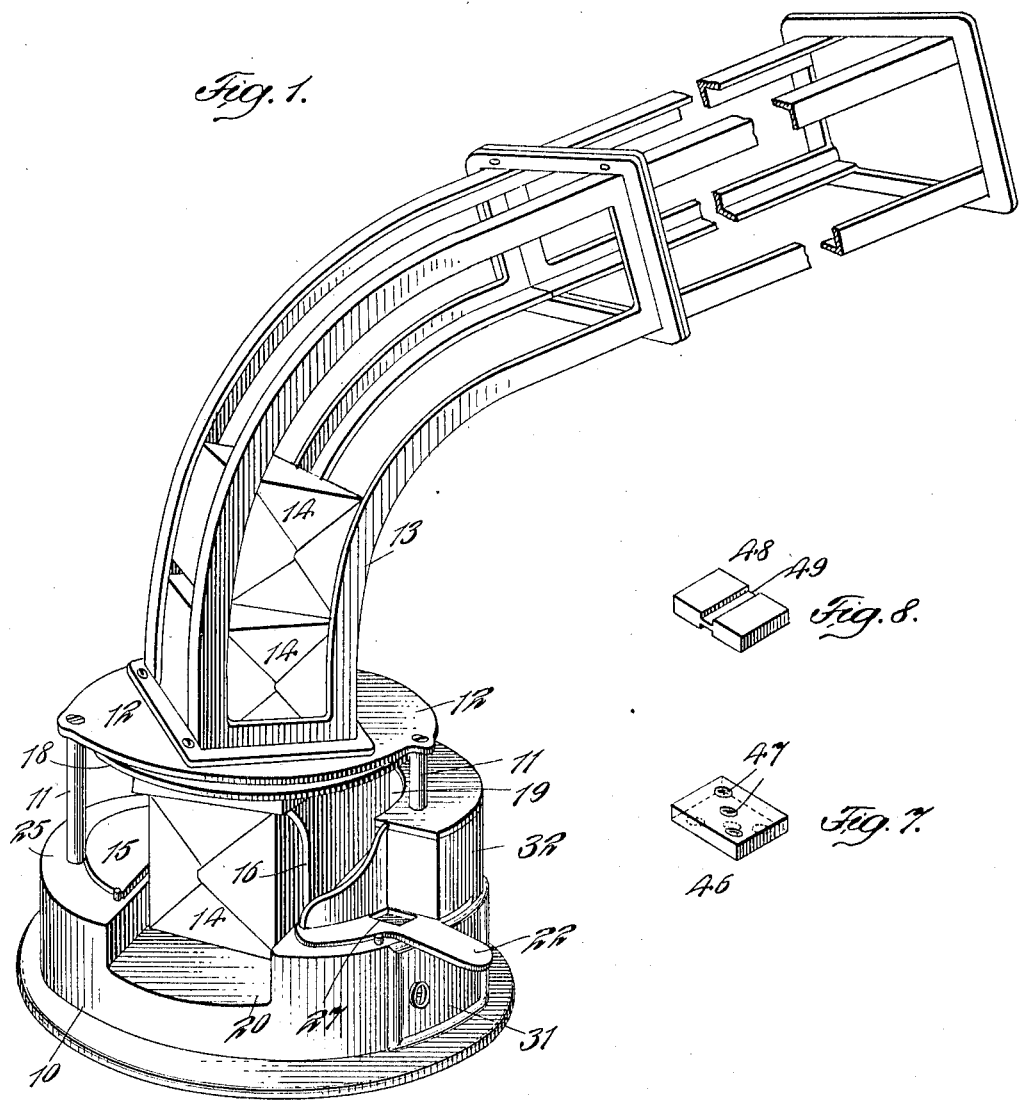
WITNESSES
INVENTOR
Clement C. Clawson
BY
ATTORNEY C. C. CLAWSON.
COIN CONTROLLED VENDING MACHINE.
APPLICATION FILED DEC. 30, 1910.
1,048,660.
Patented Dec. 31, 1912.
3 SHEETS—SHEET 2.
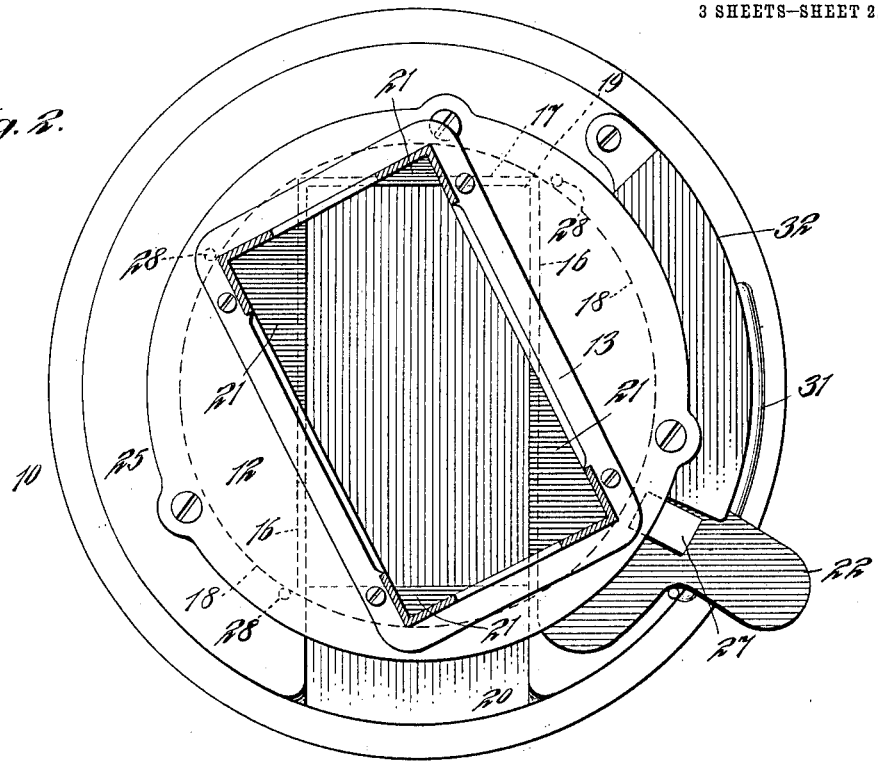
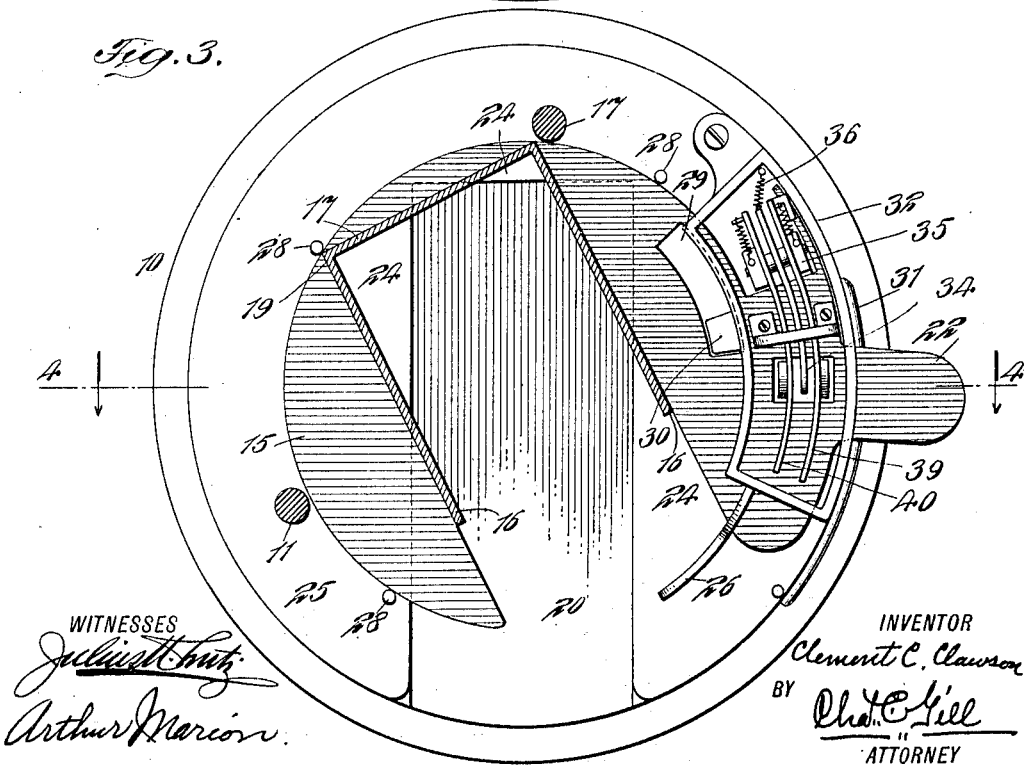
WITNESSES
INVENTOR
Clement C. Clawson
BY
ATTORNEY C. C. CLAWSON.
COIN CONTROLLED VENDING MACHINE.
APPLICATION FILED DEC. 30, 1910.
1,048,660.
Patented Dec. 31, 1912.
3 SHEETS—SHEET 3.
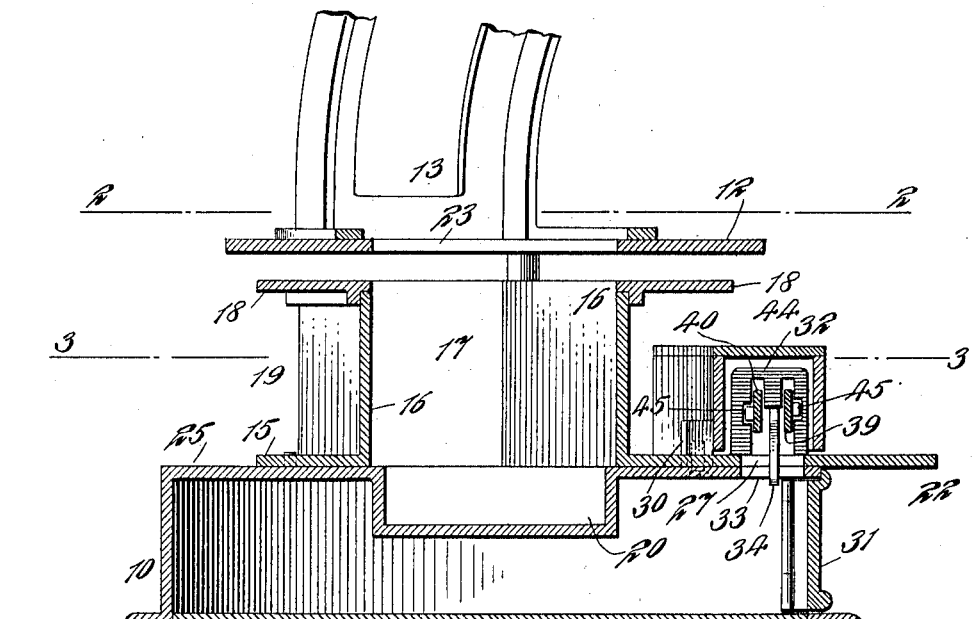
Fig. 4.
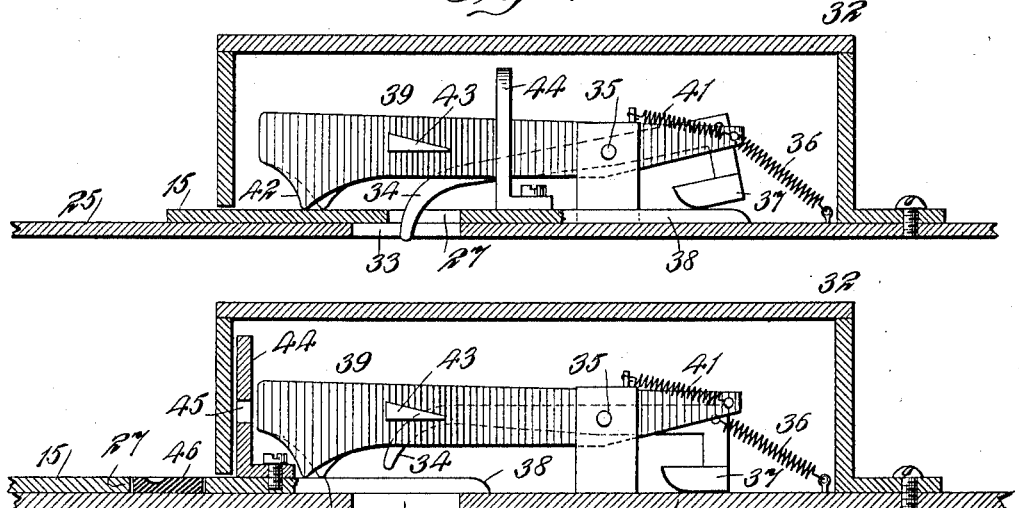
Fig. 5.
Fig. 6.
WITNESSES
INVENTOR
Clement C. Clawson
BY
ATTORNEY

UNITED STATES PATENT OFFICE.

CLEMENT C. CLAWSON, OF FLAGTOWN, NEW JERSEY.

COIN-CONTROLLED VENDING-MACHINE.

1,048,660.

Specification of Letters Patent. Patented Dec. 31, 1912.

Application filed December 30, 1910. Serial No. 600,159.

*To all whom it may concern:*

Be it known that I, CLEMENT C. CLAWSON, a citizen of the United States, and a resident of Flagtown, in the county of Somerset and State of New Jersey, have invented certain new and useful Improvements in Coin-Controlled Vending-Machines, of which the following is a specification.

The invention relates to improvements in vending machines, and it consists in the novel features, structure and combinations of parts hereinafter described, and particularly pointed out in the claims.

One purpose of this invention is to provide a vending machine adapted for the sale of packages of candy, butter, eggs, and other merchandise, especially in stores which during certain days and certain periods of the day become so congested with customers as to make it inconvenient for persons to be waited on in the usual manner. In stores selling candy, butter and the like, there are usually a large number of packages of uniform size, such as pound packages, sold, and the machine of my invention is intended for the handling of these packages. A customer introducing a proper coin or a proper check purchased at the cashier's desk, into the machine and operating machine to release one of the packages, may quickly wait upon himself and thus save his own time and aid in relieving the congestion in the store.

The machine of my invention has been specially constructed for the sale of packages of substantial size, for instance, half pound and pound packages, but it may just as easily be built for selling packages weighing several pounds each as for the sale of packages weighing, say, one pound each.

It is my purpose that the machines may in many instances be rendered operable for the sale of packages by means of checks of special character which will be purchased from the cashier or clerk in the store and be introduced to the machine instead of coins, each check being of predetermined value sufficient for the charge for one of the packages in the machine. The checks will vary in special characteristics the same as keys for locks vary one from another, so that a check intended for one machine selling goods at one price may not be capable of rendering operable another machine selling goods at a different price. The checks will also be of a character to make it difficult for an unscrupulous person to attempt to use any but a proper check purchased from the attendant in the store.

In handling packages of considerable weight, such as pound packages or half pound packages, containing delicate material, such as fresh candies, butter or the like, care should be taken to prevent the lower packages in the stack from being crushed, especially at the intervals at which the bottom package of the stock is released to be withdrawn from the machine, and to accomplish this result I provide a chute of special construction to hold the stack of packages, the lower end of the chute being grooved or on the arc of a circle and the upper portions of the chute being on an incline. With a chute of this construction the packages on the inclined portion of the chute will have their weight largely supported by the lower inclined wall of the chute, while the packages in the lower arc-like end of the chute are prevented from lying flat one upon another, but on the contrary are compelled to stand at a slight angle to one another with their rear edges only in contact with one another, whereby the lower packages do not press with their full weight against one another, and the weight of the stack is prevented from exerting its force against the lower packages. In the construction of my machine I provide for the release of the bottom package of the stack by two stages rather than permitting the package to make one drop from the bottom end of the chute through the intermediate mechanism of the machine into the pocket or space from which it may be withdrawn, since in this way the contents of the package are not so liable to be jarred or injured as would otherwise be the case. In the machine of my invention I provide between the chute holding the packages to be sold and the base of the machine from which the released packages are withdrawn, a rotary frame having formed within it a receptacle which is open at its top, bottom and one end and of an outline corresponding with the packages to be sold; when the rotary frame is in its initial position its said receptacle stands at an angle to the opening at the bottom of the chute, and hence no packages may enter it, and when by the rotation of the frame said receptacle is turned to a position at which it is in line with the opening at the bottom of the chute, a package from the chute will descend therein, but will not be permitted to escape at that time therefrom, because the receptacle will then stand at an angle to the pocket in the base below the chute into which the package is finally discharged. The descent of the package into the receptacle of the rotary frame constitutes one stage of the movement of the package toward its discharge position and it then rests upon portions of the base of the machine. When the rotary frame is returned, with the package then therein, to its initial position, the opening in its bottom passes into vertical alinement with the discharge pocket in the base of the machine and the opening in its top moves into annular relation with the opening at the bottom of the chute, and under such conditions the stack of goods in the chute will be supported upon the said frame and the package which was in the receptacle therein will be left unsupported and fall into the pocket in the base below the same, whence it may be withdrawn by hand, leaving the machine in condition for further operation.

The invention will be fully understood from the detailed description hereinafter presented, reference being had to the accompanying drawings, in which:

Figure 1 is a perspective view, partly broken away, of a machine constructed in accordance with and embodying my invention, one of the packages being shown free to be withdrawn from the machine and the mechanism of the machine being in its initial condition ready for operation; Fig. 2 is a sectional view of the same on the dotted line 2—2 of Fig. 4, the mechanism of the machine being shown in its initial condition ready for operation; Fig. 3 is a horizontal section through the machine on the dotted line 3—3 of Fig. 4, the manually operative mechanism being shown in its semi-operated position, the exposed handle having been moved from the position in which it is illustrated in Fig. 2 to that represented in Fig. 3; Fig. 4 is a vertical transverse section through the lower portion of the machine on the dotted line 4—4 of Fig. 3; Fig. 5 is a vertical section through the check or coin-operative mechanism, illustrating the position of the same in that condition of the machine shown in Fig. 3;
Fig. 6 is a like view of the same with its parts in a different or in their initial position prior to the operation of the machine; and Figs. 7 and 8 illustrate respectively checks of varying thicknesses which will when desired be employed in lieu of coins for operating the machine.

In the drawings 10 designates a stationary base supporting at a suitable elevation therefrom by rods 11, or otherwise, a stationary auxiliary base plate 12 upon which is fastened the lower end of the chute 13 to contain the packages 14 to be vended by the machine. Between the base 10 and plate 12 is mounted to have a partial rotary movement a frame comprising a lower horizontal disk-like flange 15 resting upon the base 10, a rectangular body portion comprising two sides 16 and an inner end 17, and an upper disk-like portion 18 which is slightly below and parallel with the upper horizontal plate 12. I have illustrated the plate 18 as being in a separate piece snugly set upon the edges of the vertical walls of said frame, as shown in Fig. 4. The rotary frame which I will, for convenience, designate as 19, forms within it a rectangular receptacle adapted to the size of the packages 14 to be sold, said receptacle defined by the vertical walls of the frame being open at its lower end and also open at its upper end, the plate or disk 18 being cut out in its central portions on the line of said receptacle, so that in the proper operation of the machine a package 14 may descend from the chute 13 into said receptacle and finally be discharged through the open bottom thereof into a rectangular pocket 20 formed in the base 10 and from which the package may be withdrawn by hand.

The rotary frame 19 may be given a partial rotary movement on a central vertical axis from its inoperated position represented in Figs. 1 and 2 to its position shown in Fig. 3 and then back to its position shown in Figs. 1 and 2, the complete movement back and forth being required for the discharge of one of the packages 14 into the pocket 20. When the frame 19 is in its initial position shown in Fig. 2 the lower package in the chute 13 will rest at its corners thereon; the plate 18 of said frame is at such time so positioned that the opening therein leading to the receptacle within said frame is at an angle to the opening through the plate 12 which coincides with the inner walls of the chute 13. Therefore when the rotary frame 19 is in its initial position shown in Fig. 2, the lower package 14 will be supported upon the top of the same and will support the packages above it, and none of the packages will be enabled to pass downwardly through the machine. In Fig. 2 those portions of the plate 18 which support the lower package in the chute 13 have been shaded and for purposes of identification I number them 21, and it will be observed that the parts 21 of the plate 18 are amply sufficient to support at its corner portions the lower package 14 and enable it to support the packages above it in the chute 13. When it is desired to permit one of the packages 14 to descend into the pocket 20, wherein in Fig. 1 I have illustrated one of said packages, the proper coin, check, or the like, will be introduced to the machine and the frame 19, by means of a suitable handle 22, will be rotated from the position in which the frame is illustrated in Figs. 1 and 2 to the position shown in Fig. 3, and then back to the position in which it is shown in Figs. 1 and 2. When the frame 19 is moved to the position shown in Fig. 3, its receptacle or body portion is carried into alinement with the opening 23 in the plate 12 and out of alinement with the pocket 20 in the base 10, as shown in Fig. 3, in which it will be observed that the sides 16 and end 17 of the frame 19 have moved into alinement with the walls of the chute 13 and that the parts, numbered 21, of the plate 18 have become concealed below the plate 12, while at the same time said sides 16 and end 17 expose portions, which for identification I number 24, of the top 25 of the base 10. When the rotary frame 19 reaches the position in which it is shown in Fig. 3, the lower package 14, which previously rested upon the portions 21 of the plate 18, will descend downwardly within said frame and rest upon the portions 24 of said base 10, the receptacle portion of the frame then having passed into alinement with the opening 23 in the chute supporting plate 12. The package will, however, be incapable of removal from the frame 19 since the open end of the receptacle portion of said frame will then be partly closed by a plate 26 and in order to effect the release of the package the frame 19 must be restored to its initial position shown in Fig. 2. While the frame 19 is being returned to its initial position from that shown in Fig. 3, the sides 16 and end 17 will return to their alinement with the vertical walls of the pocket 20 and cause the package 14, then between said sides, to turn angularly with the frame and thereupon, upon the frame 19 reaching its initial position, the said package will be directly over the pocket 20 and being left unsupported, having been carried from the portions 24 of the base 10, will fall downwardly into said pocket, as shown in Fig. 1, whence it may be readily withdrawn by hand. During the return movement of the frame 19 from the position shown in Fig. 3 to that illustrated in Fig. 1, the opening in the plate 18, while being carried into alinement with the vertical walls of the pocket 20, will pass into its previous angular relation to the opening 23 in the plate 12 at the bottom of the chute 13, as shown in Fig. 2, and upon reaching its initial at rest position said frame will have passed below the package directly on the package in the pocket 20 and support the stack of packages, as before. In the semi-operated condition of the machine shown in Fig. 3, the lower package in the chute 13 will be left unsupported and descend into the receptacle formed in the frame 19 and come to rest upon the then exposed parts 24 of the base 10, and at the same time the next succeeding package 14 will settle upon the package then held in the frame 19, which package in said frame will in such semi-operated position of the frame 19 support all of the packages above it. When the frame 19 is moved from its semi-operated position shown in Fig. 3 back to its initial position shown in Figs. 1 and 2 it, as aforesaid, carries the package within it to alinement with the vertical walls of the pocket 20 and allows said package to descend into said pocket, whence it may be removed by hand, and at the same time the frame 19 when returning to its initial position carries the portions 21 of its plate 18 below the then lower package in the chute 13, thereby preventing said package from escaping and affording a support for all of the packages in the chute. The frame 19 cannot be rotated at all when a package 14 is in the pocket 20 nor can it be operated except when the proper coin or check has been introduced to an opening 27 in the plate 15 of said frame. The pocket 20 is less in depth than the receptacle portion of the frame 19 and than the thickness of a package 14, and hence a sold-package must be manually withdrawn from the open ends of said pocket and receptacle before the frame 19 can be again operated. The pocket 20 and receptacle portion of the frame 19 coincide in their open outer end portions, as shown in Fig. 1, and hence when the sold-package has descended to the said pocket it may be manually withdrawn from said pocket and receptacle. The construction presented also avoids an undue fall of the package, when descending, to the pocket 20. After the frame 19 has been moved to its position shown in Fig. 3 the package which will then descend therein cannot be withdrawn until said frame has been restored to its initial position shown in Figs. 1 and 3 preparatory to further operation, and this compels the purchaser to restore said frame to its initial position at the time of each purchase.

I provide the machine with means, which will be hereinafter described, for preventing the operation of the frame 19 except when a coin or check of proper character is placed in the opening 27.

In the construction shown the bottom plate 15 of the frame 19 is of disk outline throughout the greater portion of its extent and is guided during its rotary movement by the rods 11 and pins 28 (Fig. 3). The frame 19 is limited in its extent of rotary movement by means of a slot 29 formed in the plate 15 and a lug 30 which is rigid with the base 10. Below the top 25 of the base 10 is formed a chamber, said base being a hollow casting, which may be used to receive such coins or checks as may be fed to the machine, and at one side of said base I provide it with a suitable door 31 through which the coins or checks fed to the machine may be withdrawn. Above that portion of the base 10 adjacent to the door 31 I provide certain safety mechanism to prevent the cheating of the machine with the use of improper checks, and said mechanism is inclosed within a casing 32 forming a closed chamber into which checks placed in the opening 27 of the frame 19 will be carried as soon as the handle 22 is started from the position shown in Fig. 2 to that represented in Fig. 3. The top 25 of the base 10 is, below the casing 32, formed with an exit opening 33 through which proper checks carried inwardly in the opening 27 may descend when said opening 27 is above the opening 33. The special safety mechanism inclosed by the casing 32 will be described hereinafter.

The chute 13 is preferably formed of sections screwed together, each section being an integral casing and formed with open sides and angular corners, said angular corners being adapted to engage the corners of the packages 14 and not only guide said packages but prevent their dislodgment from the chute except properly through the lower end thereof. By making the chute 13 in sections the chute may be made as long as may be desired and extended in a convenient direction or to a convenient location. It is of special importance when packages of material liable to be crushed are being handled that the lower section of the chute 13 be on the arc of a circle so that the packages therein may not lie directly one upon another but only engage one another at the inner edges of the package along the rear or smaller arc of the circle defining the chute section, as I represent in Fig. 1, in which it will be seen that the upper package does not lie flat upon the one below it but engages the lower package at one edge only, the front portion of the upper package being, by such engagement, held against the corner walls of the chute. The same condition as to the packages will prevail through the lower curved section of the chute, and hence the packages in said section will have no tendency to crush one another. When, during the use of the machine, the frame 19 is turned to the position shown in Fig. 3 and allows the lower package of the stack to descend to the receptacle formed within said frame, there would be considerable jar to the packages than suddenly shifting downwardly in the chute if all said packages rested flat one upon another, but in the construction presented the packages in the lower section of the chute do not rest flat one upon another, and hence when the bottom package descends into the frame 19 the line of packages settle downwardly with a degree of gentleness which results in none of the packages being injured. One reason for permitting the bottom package of the stack to descend within the receptacle 19 and upon the top of the base 10 and then on the further movement of the frame 19 descend therefrom into the pocket 20, is to break the descent of the package from the chute 13 to the pocket 20 and allow the descent to be effected by stages, thus preventing injury to the contents of the bottom package. I contemplate the employment of my machine for the sale of packages of butter, eggs, confections, and various other substances put up, for instance, in pound packages or in packages containing a predetermined number of eggs or the like, and in handling packages of this weight it is highly desirable that the jar which otherwise might ensue at the times of the escape of the successive packages, be prevented, and this result is accomplished in my invention by the employment of the curved chute section 13 which holds the packages 14 in the manner shown and hereinbefore described. Those sections of the chute 13 above the lower curved section are on an incline leading to said lower section, and the packages which may be in the upper inclined section or sections of the chute rest with their weight largely upon the lower side of the chute, with the result that during the descent of the packages, as one after another is discharged from the lower end of the chute, said packages do not press with their weight exerted against one another except to a degree which is not prejudicial.

The operation of the machine, less that connected with the safety mechanism within the casing 32, will be understood in great measure from the description hereinbefore presented. The chute 13 will be filled with the packages 14 when the frame 19 is in its initial position shown in Figs. 1 and 2, and when the frame is, by means of the handle 22, turned from the position shown in Figs. 1 and 2 to that shown in Fig. 3, the lower package 14 will descend within the receptacle formed by the frame 19, but will not be at such time withdrawable therefrom, and when the frame 19 is returned to its position shown in Figs. 1 and 2, the package which it held will descend into the pocket 20 and its open upper end will take an angular position with respect to the opening at the lower end of the chute 13 and thus be enabled at the portions 21 of the frame 19 to support the packages within the chute and prevent their escape except upon a re-operation of the frame 19.

The mechanism within the casing 32 may vary, but I prefer to make use of the mechanism illustrated in the accompanying drawings for preventing improper operations of the machine. Within the casing 32 is provided a coin ejector 34 which is pivotally mounted on a transverse pin 35 and connected with a spring 36 which has a normal tension pulling the rear end of the ejector downwardly and its forward downwardly curved end in an upward direction or to hold, in other words, said ejector 34 in its normal inoperated position shown in Fig. 6. The ejector is formed at its rear end with a downwardly extending arm carrying at its lower end a shoe 37, and the plate portion 15 of the rotary frame 19 is formed at one side, within the casing 32, with a tongue 38 adapted when the said plate is rotated from its position shown in Fig. 2 to that illustrated in Fig. 3, to pass below the shoe 37, as shown in Fig. 5 and force said shoe and the rear end of the ejector upwardly, with the result that the forward end of said ejector will be positively depressed through the openings 27 in the plate 15 and 33 in the plate 25 and force the check or coin downwardly through said openings and into the chamber formed within the base casing 10. Ordinarily the ejector 34 will not be necessary, but it is possible that at times a coin or check may become wedged in the opening 27 and be required to be forced therefrom. The ejector 34 is, therefore, provided, and on each movement of the plate 15 from the position shown in Fig. 2 to that shown in Fig. 3, the ejector will be operated as shown in Fig. 5 to keep the openings 27, 33 entirely clear. Upon the return of the plate 15 from the position shown in Fig. 3 to that illustrated in Fig. 2, the spring 36 will restore the ejector to its normal position shown in Fig. 6. At the opposite sides of the ejector 34 I pivotally mount upon the transverse pin 35 lever-plates 39, 40, said plates being parallel with each other and each having a spring 41 tending to keep the forward ends of said plates depressed upon the plate 15. The plates 39, 40 adjacent to their forward ends are tapered down to dart form or pointed, as at 42, and at the outer side of each plate 39, 40 is formed a projection 43, which I preferably make of wedge form, the point of the wedge being extended rearwardly of said plates. Upon the plate 15, within the casing 32, is secured a vertical plate 44, which is slotted, as shown in Fig. 4, to enable it to pass over the plates 39, 40 when the plate 15 is given its partial rotary movements. The plate 44 is also recessed in its opposite inner edges, as at 45, to pass over the projections 43 on the plates 39, 40 when said projections are so positioned by the check or coin used in operating the machine that they are properly in line with said recesses 45. In any instance in which the plate 15 may be started in motion from its position shown in Fig. 2 to that illustrated in Fig. 3 without their being in the opening 27 a check of the proper characteristic to pass under the darts 42 of the plates 39, 40, and thereby position said plates to carry the projections 43 thereof into proper alinement with the recesses 45 in the plate 44, said plate 44 instead of passing inwardly along the plates 39, 40 to the position in which it is shown in Fig. 5, will become arrested against the butt ends of the projections 43 and prevent the operation of the plate 15. I make use of two levers 39, 40 and of a check of irregular surface for the opening 27 in the plate 15 for the double security of making it necessary that both of the plates 39, 40 shall be properly positioned to aline their projections 43 with the recesses 45 in the plate 44, either one of said plates when out of proper position being sufficient to form a stop arresting the plate 44 and through it the plate 15. In Fig. 7 I show a check 46 having recesses 47 which afford irregularity in the surface of the check for properly positioning as the check passes below the darts 42, the plates 39, 40 so that the projections 43 may take a position in alinement with the recesses 45 in the plate 44. I show three of the recesses 47 in the top of the check 46 so that no care may be necessary as to how the check is placed in the opening 27. No matter which end of the check 46 is placed inwardly when presenting the check to the recess 27, there will be two of the recesses 47 in line with the plates 39, 40. I also provide the reverse side of the check 46 with the recesses 47, as indicated by the dotted lines in Fig. 7, so that it will be of no consequence which side of the check is placed uppermost when introducing the same to the opening 27. The checks 46 may vary greatly in surface conditions, and will do so for various machines, and in Fig. 8 I illustrate a check 48 having a groove 49 extending across it. In the employment of a check 48 the dart on one of the plates 39, 40 will travel through the groove 49 and the dart on the other plate will ride over the top surface of the check, and in this way the irregularity in the surface of the check will be the means for positioning the plates 39, 40 so that the recesses 45 of the plate 44 may pass over the projections 43 without interference. In constructing the machine there will be variations in the checks so that one check may not be used in a machine for which it was not intended, and in varying the surface outline of the checks due regard must be had to the relation of the recesses 45 in the plate 44 and the projections 43 on the plates 39, 40, so that the check intended for use on a certain machine will necessarily by riding under the darts of the plates 39, 40 be enabled to secure the passage of the plate 44 over the projections 43. The projections 43 are tapered rearwardly so that no difficulty may be experienced in the return of the plate 44 from its position shown in Fig. 5 to that illustrated in Fig. 6.

I prefer the use of checks such as those indicated in Figs. 7 and 8 rather than coins for operating my machine, since the machine is not intended for penny articles but for packages weighing from one-half pound up. A half pound package might be worth fifteen cents, and in such instance it will be seen that a purchase of a fifteen cent check would be necessary for operating the machine.

The specific mechanism inclosed within the casing 32 not being permissible under the rules of the Patent Office of being claimed herein with the vending machine proper will be made the subject of a separate application for Letters Patent.

What I claim as my invention and desire to secure by Letters Patent, is:

1. A machine of the character described comprising a chute to hold a stack of packages to be sold, a rotary frame below the same to receive the successive packages as they descend from said chute and a base containing an open-ended delivery pocket below said frame for the release packages, said frame having a receptacle therein which is open at its top, bottom and outer end for the successive packages and in one position thereof holding said receptacle in angular relation to the lower end of said chute and in the plane of said pocket and in the other position thereof holding said receptacle in the plane of the chute and in angular relation to said pocket, whereby the descent of a sold-package to said pocket is by stages, and said receptacle being greater in depth than said pocket, whereby the sold-package is held partly in said receptacle and partly in said pocket and may be withdrawn from the coinciding open ends of the same; substantially as set forth.

2. A machine of the character described comprising a chute to hold a stack of packages to be sold, a rotary frame below the same to receive the successive packages as they descend from said chute and a base containing a delivery pocket below said frame for the released packages, said frame having a receptacle therein which is open at its top, bottom and outer end for the successive packages and in one position thereof holding said receptacle in angular relation to the lower end of said chute and in the plane of said pocket and in the other position thereof holding said receptacle in the plane of the chute and in angular relation to said pocket, whereby the descent of a sold-package to said pocket is by stages, and said receptacle being greater in depth than said pocket, whereby the sold-package is held partly in said receptacle and partly in said pocket and may be withdrawn from the coinciding open ends of the same, combined with means for preventing the withdrawal of a package from the open end of the receptacle when the latter is in angular relation to said pocket; substantially as set forth.

3. A machine of the character described comprising a chute to hold a stack of packages to be sold and having an open lower end corresponding with the outline of said packages, a base having depending from its upper surface an open-ended pocket corresponding in outline with the open lower end of said chute and standing in angular relation thereto and being less in depth than the thickness of said packages, and a rotary frame between said chute and base and comprising top and bottom plates and a vertical receptacle between said plates open at its top, bottom and outer end and corresponding with the outline of the packages to be sold, said frame in its initial position holding its receptacle in angular relation to the open lower end of the chute and in the plane of said pocket and supporting on its top plate the stack of packages and in its other or semi-operated position holding said receptacle in the plane of the chute and in angular relation to said pocket, whereby a package at that time descending into said receptacle will fall upon the top of said base in angular relation to said pocket preparatory to being carried to alinement with the pocket on the return of the frame to its initial position; substantially as set forth.

4. A machine of the character described comprising a chute to hold a stack of packages to be sold and having an open lower end corresponding with the outline of said packages, a base having depending from its upper surface a pocket corresponding in outline with the open lower end of said chute and standing in angular relation thereto and being less in depth than the thickness of said packages, and a rotary frame between said chute and base and comprising top and bottom plates and a vertical receptacle between said plates open at its top, bottom and outer end and corresponding with the outline of the packages to be sold, said frame in its initial position holding its receptacle in angular relation to the open lower end of the chute and in the plane of said pocket and supporting on its top plate the stack of packages and in its other or semi-operated position holding said receptacle in the plane of the chute and in angular relation to said pocket, whereby a package at that time descending into said receptacle will fall upon the top of said base in angular relation to said pocket preparatory to being carried to alinement with the pocket on the return of the frame to its initial position, and said receptacle being open at its front end, combined with means for preventing the withdrawal of a package from the open end of the receptacle when the latter is in angular relation to said pocket; substantially as set forth.

5. A machine of the character described comprising a chute to hold a stack of rectangular packages and in itself being rectangular in cross-section to correspond with the outline of said packages and having a curved lower portion to prevent the packages lying flat one against another, a rotary delivery frame below said chute to receive the successive packages as they descend therefrom, and a base containing a delivery pocket below said frame for the packages released by said frame, said frame having an open receptacle therein for the successive packages and in one position thereof holding said receptacle in angular relation to the lower end of said chute and in the plane of said pocket and in the other position thereof holding said receptacle in the plane of the chute and in angular relation to said pocket whereby the descent of a sold-package to said pocket is by stages; substantially as set forth.

6. In a machine of the character described comprising a chute to hold a stack of rectangular packages and in itself being rectangular in cross-section to correspond with the outline of said packages and having a curved lower portion to prevent the packages lying flat one against another, a rotary delivery frame below said chute to receive the successive packages as they descend therefrom, and a base containing a delivery pocket below said frame for the packages released by said frame, said frame having an open receptacle therein for the successive packages and in one position thereof holding said receptacle in angular relation to the lower end of said chute and in the plane of said pocket and in the other position thereof holding said receptacle in the plane of the chute and in angular relation to said pocket, whereby the descent of a sold-package to said pocket is by stages, and said receptacle being open at its front end, combined with means for preventing the withdrawal of a package from the open end of the receptacle when the latter is in angular relation to said pocket; substantially as set forth.

7. In a machine of the character described comprising a chute to hold a stack of rectangular packages and in itself being rectangular in cross-section to correspond with the outline of said packages and having a curved lower portion to prevent the packages lying flat one against another, a rotary delivery frame below said chute to receive the successive packages as they descend therefrom, and a base containing a delivery pocket below said frame for the packages released by said frame, the upper portion of said chute being on an incline to take a portion of the weight of the packages therein and thereby prevent the packages from unduly pressing against one another in series; substantially as set forth.

Signed at New York city, in the county of New York and State of New York, this 20th day of December A. D. 1910.

CLEMENT C. CLAWSON.

Witnesses:
ARTHUR MARION,
CHAS. C. GILL.

---

Copies of this patent may be obtained for five cents each, by addressing the "Commissioner of Patents, Washington, D. C."